United States Patent
Gray et al.

(10) Patent No.: US 7,536,001 B2
(45) Date of Patent: May 19, 2009

(54) GENERATION OF AVAILABILITY INDICATORS FROM CALL CONTROL POLICIES FOR PRESENCE ENABLED TELEPHONY SYSTEM

(75) Inventors: Thomas A. Gray, Carp (CA); Ramiro Liscano, Nepean (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1196 days.

(21) Appl. No.: 10/631,747

(22) Filed: Aug. 1, 2003

(65) Prior Publication Data

US 2004/0037396 A1    Feb. 26, 2004

(30) Foreign Application Priority Data

Aug. 12, 2002  (GB)  ................................. 0218714.4

(51) Int. Cl.
*H04M 3/42*       (2006.01)
*H04M 1/64*       (2006.01)
(52) U.S. Cl. ................................. 379/201.01; 379/67.1
(58) Field of Classification Search ............ 379/265.02, 379/67.1, 201.01
See application file for complete search history.

(56) References Cited

U.S. PATENT DOCUMENTS

| | | | | |
|---|---|---|---|---|
| 7,272,662 | B2 * | 9/2007 | Chesnais et al. | ............ 709/246 |
| 2002/0085701 | A1 | 7/2002 | Parsons et al. | |
| 2002/0087320 | A1 | 7/2002 | Lee et al. | |
| 2002/0133532 | A1 * | 9/2002 | Hossain | ...................... 709/105 |

FOREIGN PATENT DOCUMENTS

| | | |
|---|---|---|
| EP | 1198113 A1 | 4/2002 |
| GB | 2 351 870 A | 1/2001 |
| WO | WO 98/37659 | 8/1998 |
| WO | WO 00/26827 | 5/2000 |
| WO | WO 01 93552 A1 | 12/2001 |
| WO | WO 02/37812 A2 | 5/2002 |

* cited by examiner

*Primary Examiner*—Rasha S Al Aubaidi (57) ABSTRACT

A system for generating user availability information to a subscriber from availability rules set by the user, comprising a shared database (e.g. tuple space), a user interface for setting availability rules with fuzzy indicators of degrees of user availability, and an application level for receiving and posting a request from the subscriber for user availability information to the shared database such that predetermined ones of the availability rules post responses to the shared database, computing from these responses a crisp indication of user availability information, and transmitting the crisp indication of user availability to the subscriber.

3 Claims, 6 Drawing Sheets

GENERATION OF AVAILABILITY INDICATORS FROM CALL CONTROL POLICIES FOR PRESENCE ENABLED TELEPHONY SYSTEM

This invention relates generally to context-aware call handling in telephone systems, and more particularly to a method and apparatus for generating availability indicators from call control policies for presence enabled telephone systems.

BACKGROUND OF THE INVENTION

In current telephony systems, approximately 60% of calls end in failure as a result of the intended recipient not being reached. The ability to be aware of whether an intended recipient is currently available, such as by means of a presence system, would eliminate time wasted in making fruitless calls to absent parties.

To date, presence and availability capabilities have been confined to instant messaging systems such as Microsoft Messenger and ICQ. Users are presented with availability information in the form of buddy lists. They may see which of their corespondents are available and attempt to send an instant message to them. The instant message system attempts delivery but there is no ability, such as is provided by call control in a telephony system, to forward the call to another party, take a message, etc. Thus, no solution has been provided in the prior art to the problem of missed calls due to party unavailability.

Presence and availability systems have not yet been applied to telephony because of the significant risk of conflict between call control policies associated with users or their devices and the availability information. For example, if a user has all of his calls blocked (e.g. Do Not Disturb (DND)) while still being marked as available in the presence system, confusion is bound to ensue as a result of the conflicting call control policies.

SUMMARY OF THE INVENTION

A key aspect of the present invention is integration of availability indicators to decisions on call disposition by call control. Our co-pending patent application filed on the same date as this application and entitled "Context Aware Call Handling System" describes the operation of a context-aware call handling system. In new IP telephony systems such as SIP, a call set up message (e.g. the INVITE message in SIP, and the IAM message in IN) can include a large amount of background information about a call. The call set up message can include contextual information (e.g. the SUBJECT line in SIP), such as the calling party identity, the degree of urgency of the call, the purpose of the call, etc. Applicant's application filed on the same day as this application and entitled "Context Aware Call Handling System" describes a structure whereby this call information is analyzed and decisions are made on call handling based on the call information matching a specific context of the called party.

The contextual call handling system of Applicant's co-pending patent application takes received information and uses it to generate newer information. For example, if a call is from directory number (DN) 555-2368, the contextual system determines, firstly, who the number belongs to (e.g. John Doe) and the relationship of that owner to the called party (e.g. John Doe is the manager of the called party). This provides much more specific information about the nature of the call than is available in conventional telephony systems. The called party is therefore able to establish rules that are relevant to his personal needs for call disposition (e.g. rules to deal with calls from his manager differently than calls from some arbitrary directory number). Also, if the manager is mobile and the directory number that he uses changes, the user can create abstract rules indicating the call control actions he wishes to be taken upon receiving a call from his manager and the address of a local service that correlates directory numbers with the name of the user who is registered with that number. The user does not have to make any changes in his rule set to deal with such a mobile manager. It is expected that features such as this will become common in future personal mobile IP telephony systems.

The present invention extends the system described in Applicant's co-pending patent application to provide availability information generated by rules based on responses to received hypothetical questions. The indicators of availability include a fuzzy degree of availability from 'Not-Available' to 'Very-Available'. The results of multiple rules that fire in response to one hypothetical availability query are combined by fuzzy techniques to create a composite crisp availability decision. Removing cases that are of low relevance minimizes the effect of any factor involved in multiple fuzzy availability decisions. In the preferred embodiment, this is done by using only the most specific rule in which the factor is involved, as determined by a count of the number of factors involved in a rule—the rule with the most factors being considered to be more specific and thus more relevant. When it is not possible to select one rule among conflict rules, the system either selects the most recently created rule or simply chooses a rule at random (or randomly chooses a rule in the event of a tie among most specific rules). The use of the specific rules in call handling for availability decisions solves the problem of compatibility between availability rules and call handling rules discussed above.

BRIEF DESCRIPTION OF THE DRAWINGS

A detailed description of the invention is set forth herein below, with reference to the following drawings, in which.

DETAILED DESCRIPTION OF THE PREFERRED EMBODIMENT

As discussed above, our co-pending patent application entitled "Context Aware Call Handling System" describes the operation of a context-aware call handling system. The present invention uses the basic structure described in applicant's co-pending patent application for the generation of call control handling decisions and for the generation of availability information. The basic structure is a blackboard system surrounded by knowledge sources which process contextual information contained in a call set up message in light of a user's current context. The contextual information determines how calls are routed for an individual so as to create a form of 'personal mobility', which is a set of features of increasing interest in the telephony arts distinct from and beyond traditional call forwarding features. With personal mobility features, rather than forwarding the call to another device the most appropriate device belonging to a person is selected to handle a call.

Thus, the selection of a device for call control is either towards a user (e.g. to his/her wireless device), away from a user (e.g. to his/her voice mail, secretary, etc.), or initially toward the user and then either toward the user or away from the user based on the user's response to being asked about call disposition. As described in our co-pending application "Context Aware Call Handling System" this determination is intrinsically made on an assessment of the user's availability to the incoming caller. Thus, the same structure may be used to explicitly determine availability and to distribute availability to interested users.

Figure 1:
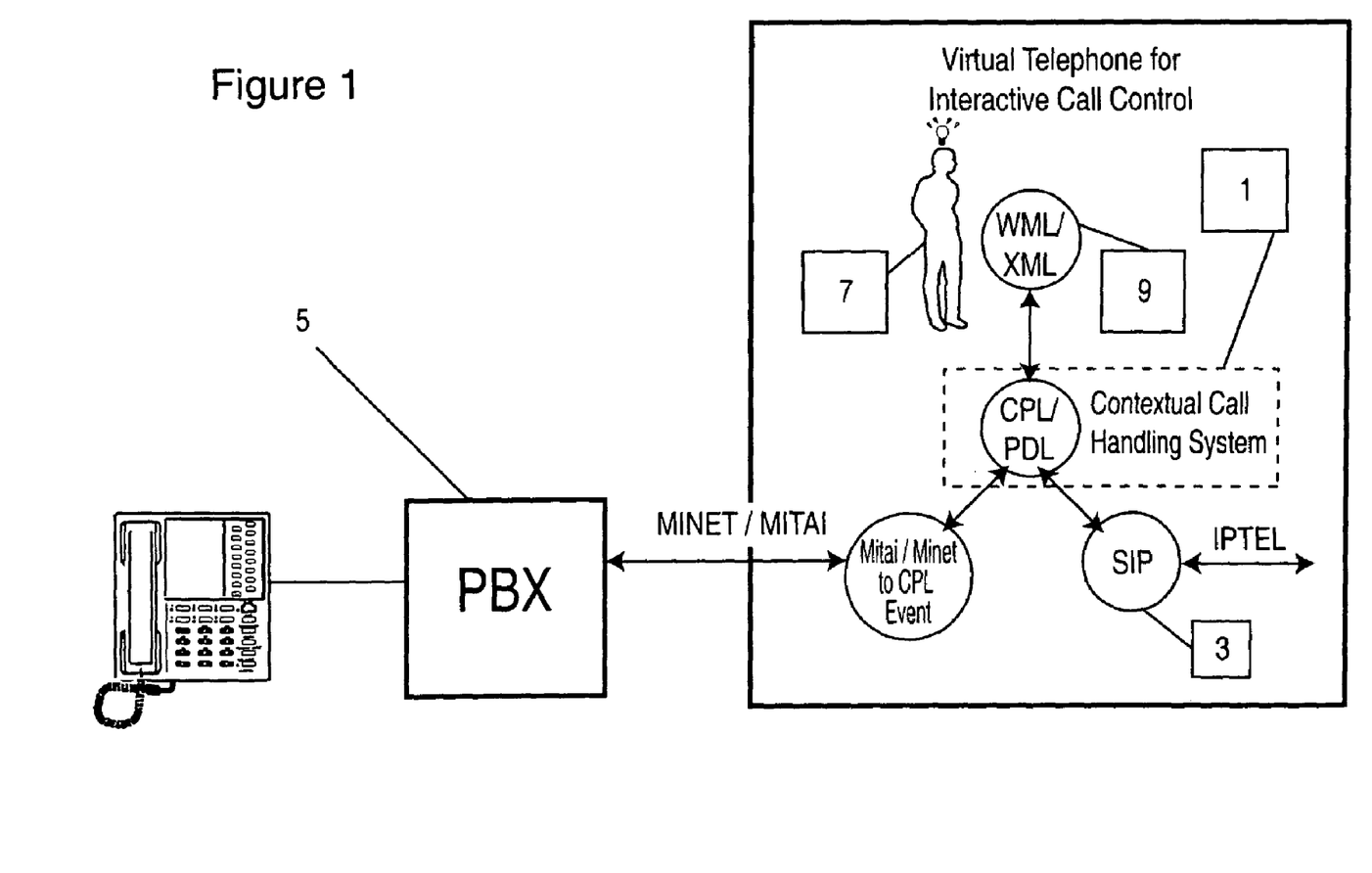
FIG. 1 is a functional diagram of an Internet telephony system according to the present invention for generating availability indicators from call control policies and awareness data.

In the last case (i.e. initially toward the user and then either toward the user or away from the user based on the user's response to being asked about call disposition), a call is presented to the user's device with options for handling, but with call alerting that is more discreet than in the case in which the call is directed to the user. With reference to FIG. 1, incoming call messages are directed to the contextual call handling system 1 (e.g. via SIP 3 or a traditional PBX system 5). The contextual call handling system can either make a final decision on the call or refer it to the user 7. In the illustrative example of FIG. 1, it is assumed that the user is on a wireless device with telephony access via a WML browser 9. However, a person skilled in the art will appreciate that other media are possible.

In the first two cases (i.e. toward the user, and away from the user), the availability information may be deduced directly from the proposed action. Hence, the contextual call control system of Applicant's co-pending patent application directly ties availability indicators to these proposed actions. In the last case (i.e. call disposition is based on decision of user 7), the system according to the present invention sets forth a mechanism for the addition of rules to generate fuzzy indicators of availability. These fuzzy indicators are composed with the indicator derived from the proposed action to produce a crisp indicator of availability that can be sent out to a subscribing user.

Before turning to an illustrative example for describing an embodiment of the invention, the basic structure of the contextual call control system 1 as described in Applicant's co-pending patent application "Context Aware Call Handling System" will be provided with reference to FIGS. 2-5.

Figure 2:
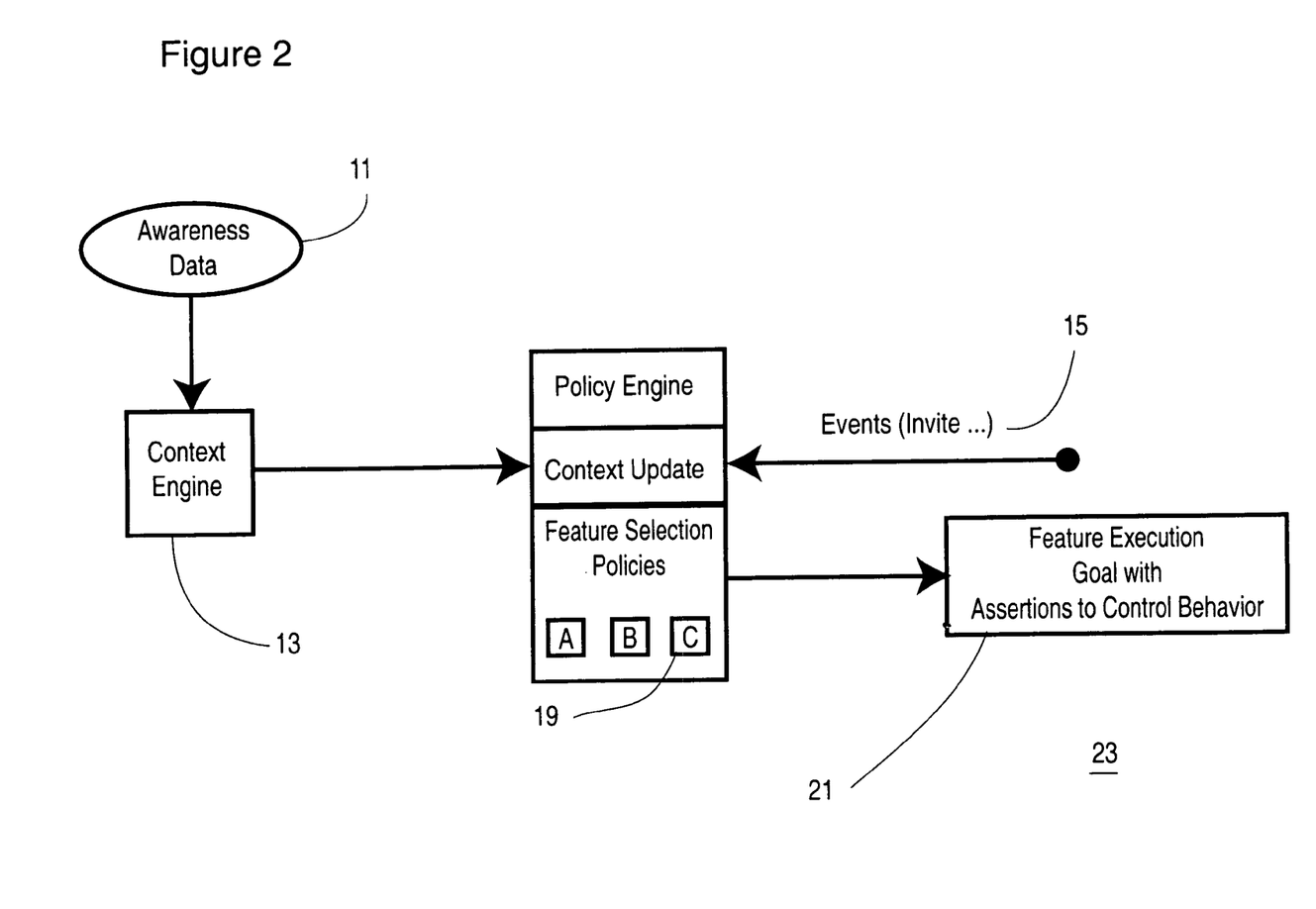
FIG. 2 is a block diagram of a contextual call handling system of the Internet telephony system in FIG. 1.

Turning to FIG. 2, a functional diagram is provided of the system according to the present invention. In operation, awareness data 11 is received from one or more ubiquitous sensors (not shown), relating to the user's location and activities, and applied to a context engine 13. A variety of technologies are available for tracking the locations of people. Examples of such ubiquitous sensors include the Active Badge System [Roy Want, Andy Hopper, Veronica Falcao, Jonathan Gibbons, "The Active Badge Location System", *ACM Transactions on Information Systems* 10(1) 91-102, 1992], PARCTabs [Norman Adams, Bill N. Schilit, Rich Gold, Michael Tso and Roy Want, "The PARCTAB Mobile Computing System", *Proceedings of the Fourth Workshop on Workstation Operating Systems (WWOS-IV)*, pages 34-39, Napa, Calif., October 1993], mobile phones [Peter Duffet-Smith, "High precision CURSOR and digital CURSOR: the real alternatives to GPS", *Proceedings of EURONAV 96 Conference on Vehicle Navigation and Control*, Royal Institute of Navigation, 1996] and ultrasonic devices [Andy Ward, Alan Jones and Andy Hopper, "A new location technique for the active office", *IEEE Personal Communications* 4(5), 43-7, 1997].

Our co-pending patent application entitled Availability and Location Predictor Using Call Processing Indications, describes a method of evidence gathering that surmises (i.e. makes guesses) about user availability from his/her interactions with a PBX system. The interactions are gathered as awareness information and processed by an algorithm into availability information. By using awareness information as evidence, the algorithm makes predictions about the users' availability or makes decisions in call processing. This information is fed back into a shared database (e.g. a tuple space) as assertions that indicate high level assessments about the user's state. These assessments are then used by the call processing components described below to make decisions on call handling.

Additional inventive aspects relating to the application of awareness data 11 to context-based communication systems is described in applicant's co-pending application filed on the same day as this application and entitled "System and method for facilitating communication using presence and communication services".

Awareness data (i.e. raw information about the user) that has been processed by context engine 13 into availability information is then applied to a policy engine 15 in the form of assertions of interest to policies within the system, as described in detail below. The policy engine 15 includes a context update block 19 and feature selection policies 21.

In context update block 19, an incoming event (e.g. SIP INVITE) is related to the current context of the user. Every event has associated with it some indicators that are pertinent to the user's call that provide evidence of the relevance, urgency and importance of the call to the user. Such indicators include caller identity, role relationship between caller and called party, group or project membership, location of user, current state of called user, subject of the call, and so on. Some of these evidential indicators are explicit in the call and some can be derived by inference from other indicators (e.g. awareness data, as discussed above). The context update block 19 uses opportunistic reasoning to develop the required evidence. This evidence is then supplied to the feature selection policies 21 for selecting a feature, discussed in greater detail below. As discussed in greater detail below, the evidential indicators are in the form of fuzzy variables. The fuzziness of these variables is used to indicate the degree of credence that the system has in them.

In the context update evidence gathering process performed by block 19, the system occasionally asks the user which feature he/she wishes to have executed. Sending the user options to his/her wireless browser asking for his/her selection is one among several mutually appropriate options for accomplishing this. Moreover, options may be sent to the calling party asking him/her to select one of several acceptable options.

As discussed above, the user sets some of the policies used in the opportunistic reasoning of context update block 19, although many of the policies are implicit in the way people generally interact. Thus, several default policies are set by system administrators using sociological principles. Examples of such default policies include calls from superiors being more important than calls from subordinates, someone alone in an office being more available than someone with several visitors, calls with a subject related to a user's current activities being less intrusive than calls with unrelated subjects, etc.

Once the user context has been updated with call specific information in block 19, the feature to be performed is selected in block 21. Feature selection policies block 21 utilizes the evidence generated previously in block 19 to direct call handling in accordance with policies set by the user governing the personalized call handling he/she expects. These policies indicate how calls should be handled for differing role relationships, time of day, user state, user location etc. According to applicant's counterpart granted patent 2351870 filed Jul. 9, 1999 and issued on Sep. 19, 2001 entitled Feature Interaction Resolution Using Fuzzy Rules, block 21 uses forward chaining with fuzzy reasoning to generate priorities among all proposed features and relates that to the intrusiveness of the proposed actions. This results in the selection of a single feature as being the most appropriate for call handling given the declared personalized preferences of the user. The feature is then executed, as shown at block 23.

The execution of features at block 23 can be modulated as described in co-pending UK Application No. 9920051.1 (Call Processing by Synchronized Tuple Spaces) to allow external features acting as enterprise constraints to control the execution of the selected feature.

Thus, with the new addressing capabilities of Internet-based telephony, features can take on new semantics. Instead of remaining at the device level as in conventional telephony, features can operate at a personal level. Calls are not directed to physical endpoints but rather to aspects of the user's identity within his/her business context. A user may have multiple aspects to his/her identity, each of which has different capabilities in the business environment. For example, a user may have multiple aspects to his identity in the form of:

Voice mail box for messages that do not need current attention

Secretary or equivalent function that can use mechanisms outside of call processing to make routine decisions about call disposition and other matters to shield the user from interruption Identities that represent the user in distinct current projects Etc.

These multiple identities may be carried directly in URLs that convey meaning in respect to aspects of the user's identity using the standard 'dot' convention. Thus, a user named John Doe may have multiple aspects of his business identity specified as:

secretary.john_doe@example.com
personal.john_doe@example.com
voice-mail.john_doe@example.com
project_3499.john_doe@example.com This change in convention effectively creates an entirely new model of how telephony features operate in converged voice and data systems. As indicated above, features in the present system operate with an understanding of the current user context and communications are directed to the most appropriate aspect of the user identity. Thus, for example, calling parties can indicate which aspects of the identity they wish to contact and which aspects-they-do-not wish to deal with.

Figure 3:
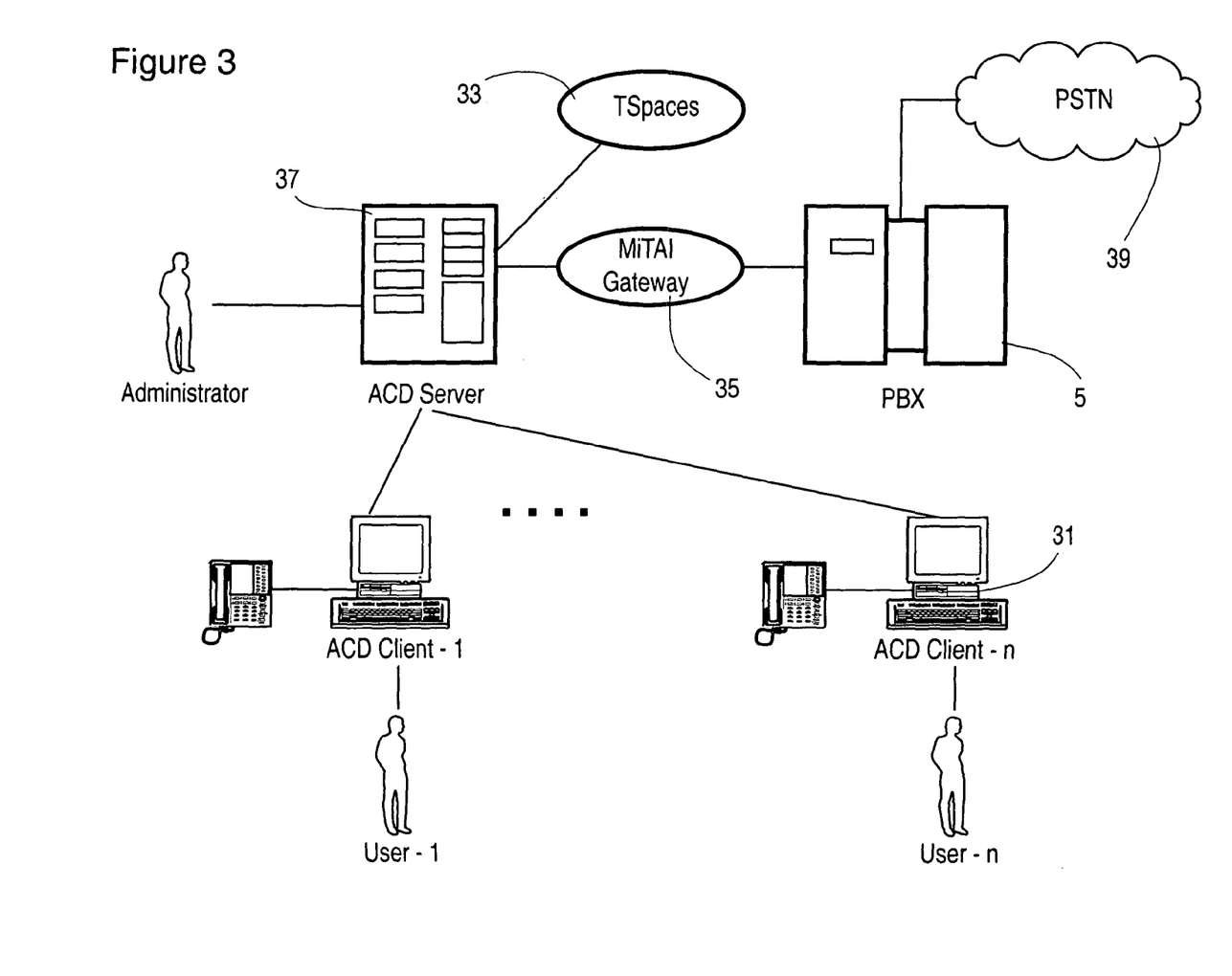
FIG. 3 is a block diagram of a hardware implementation of the system of FIG. 2.

An exemplary hardware implementation of the contextual call handling system is shown in FIG. 3. The system is based on a client-server architecture. An Active Call Delivery (ACD) client 31 communicates with an ACD server 37 which, in turn, communicates with TSpaces server 33 and a MiTAI Gateway server 35. MiTAI Gateway server 35 is connected to PBX 5 which, in turn, communicates with the PSTN 39. ACD server 37 is a single server or multiple servers having access to the TSpaces server 33. The ACD server 37 consists of user interfaces and a collection of "system agents" discussed in greater detail below. The user interfaces provide an introduction window, a login window for a system administrator, a context window for managing a hierarchy of contexts and a call simulation window for simulating a phone call. Each system agent contributes to call processing and has its own responsibilities: a Relationship Assigning (RA) agent is responsible for acquiring the relationship between a caller and a receiver, and assigning it to a relevant data field for call processing. A User Rule Assigning (URA) agent is responsible for extracting all of the matching user rules according to the conditions of each rule and the current context, and assigning them to a relevant data field for call processing. A User-rule Conflict Resolving (UCR) agent is responsible for resolving any conflict that might be present in the assigned rules. As indicated above, these agents do not have to be installed on a particular machine, but can be distributed over a network of machines, which have access to the TSpaces server 33.

The ACD client 31 consists of user interfaces and user agents. The user interfaces provide an introduction window, a login window for a registered system user, and a registration window for a new user. Knowledge management is an important part of the user interface on the client system. A user can create or manage personal information such as a buddy list, relationship information, a schedule and a user preference rule. The client server utilizes two types of agents: The Call Delivery (CD) agent and the System Management (SM) agent. The CD agent acknowledges events, which are generated by the Call Monitor, in the Tspaces server 33. The Call Monitor is a direct interface with the MiTAI Gateway 35, and creates an event that is fed into the TSpaces server 33 for starting call processing by the CD agent. Next, the SM agent acknowledges the event from the CD agent, and distributes the call processing to agents on the network. Although each agent has distinct services, both the server and the client have certain common modules as per customary object-oriented design. These common object modules and the other modules are explained below.

Figure 4:
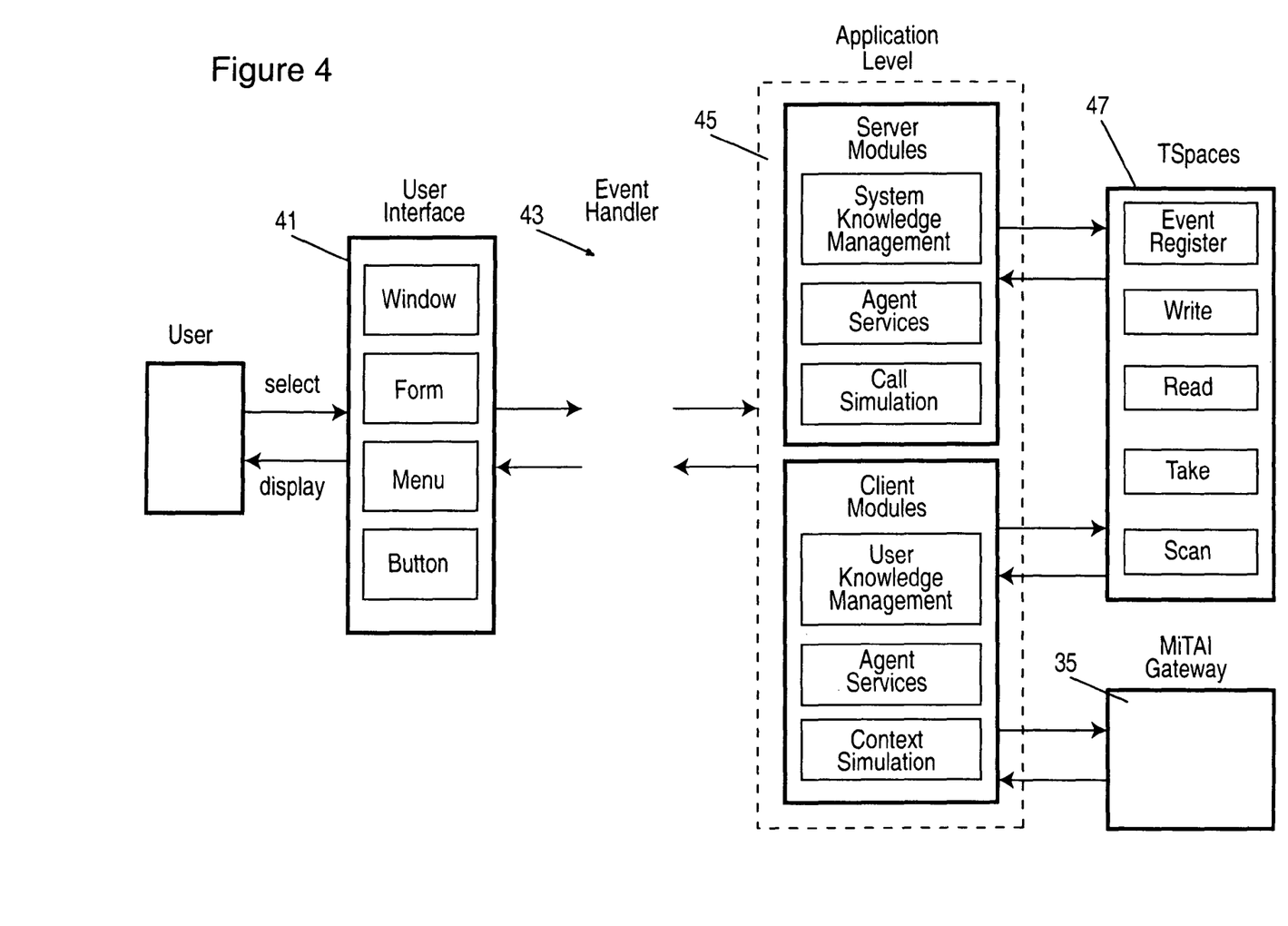
FIG. 4 shows the system architecture and module interactions for the system of FIGS. 2 and 3.

FIG. 4 shows the system architecture and module interactions for the Internet telephony system of FIGS. 2 and 3. The user interface 41 consists of windows, forms, menus and buttons for providing user login, registration, user preference rule setting, context simulation, and a display of messages for assisting the user.

The Event Handler subsystem 43 is a monitoring daemon that resides between the user interface 41 and the Application Level subsystem 45. It waits for physical events to arrive from the user interface 41, such as mouse clicks, and directs them to the appropriate application module. The development tool, Java, provides embedded event handlers, such as ActionListener, for this purpose.

The Application Level 45 is the core of the system. It consists of multiple agents that provide services for a client as well as for a server. All of the system transactions, functionalities, and knowledge management are performed within this subsystem.

Figure 5:
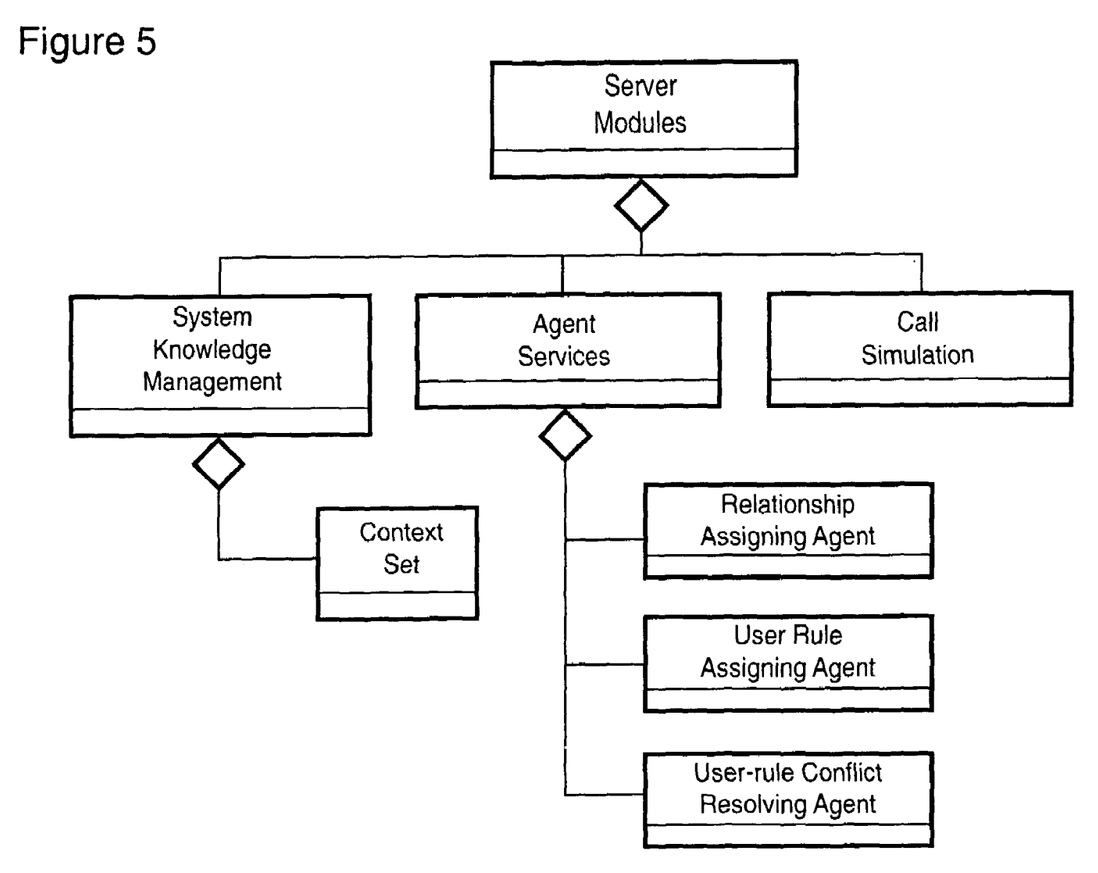
FIG. 5 is a class diagram for the server modules of FIG. 4.

As shown in the class diagram of FIG. 5, the server modules are divided into three major parts: System Knowledge Management, Agent Services and Call Simulation. The System Knowledge Management module includes a Context Set sub-module to allow an authorized administrator to create or modify a context hierarchy such as location and activity. The Agent Services module consists of three distinct agent modules: The Relationship Assigning (RA) agent, the User Rule Assigning (URA) agent, and the User-rule Conflict Resolving (UCR) agent. In order to give flexible implementation of the agents, status of the agents is managed in order to know their availability. Network connectivity may affect their availability. Therefore, both an agent and the connection between the agent and the system's TSpaces 47 (FIG. 4) must be functional in order to use the agent. The system acquires agent's status by examining a corresponding status tuple in the TSpaces 47. The status tuple consists of "name", "priority" and "availability" fields. Each agent is responsible for updating its status tuple in the TSpaces 47. The procedures for updating a status tuple consist of taking the status tuple and rewriting it with new status information once per second. A tuple can be set to expire after a predetermined time. Upon expiration, the TSpaces server 33 removes the tuple from the TSpaces 47. The expiration time for a status tuple is three seconds, so if an agent fails to update the tuple three times consecutively for any reason, there will be no status tuple for the corresponding agent in the TSpaces 47. The system assumes that an agent is abnormal if there is no status tuple for the agent, or if the "availability" field in the status tuple is set as "abnormal". The time gap between the one-second it takes to update the status tuple and the three seconds allowed before the status tuple expires may prevent unnecessary status toggling by temporal network disturbance.

Each agent is also responsible for registering an event into the TSpaces 47 to communicate with client machines. Whenever an awaited tuple is written into the TSpaces, the TSpaces server 33 notifies this to an agent that registered the event. Generating an event and getting notification of the event from the TSpaces 47 forms a two-way communication-acknowledgement between agents.

The Relationship Assigning (RA) agent is responsible for responding to a relationship-assigning request from a client's SM agent. The request from a SM agent contains caller and receiver information. The RA agent assigns the relationship between the user and the caller according to the user's buddy-list.

The User Rule Assigning (URA) agent is responsible for responding to a user-rule-assigning request from a client's SM agent. Upon request, the URA agent retrieves both the relationship information and the user's current contexts. The relationship information is a relationship between the caller and the receiver, set by the RA agent. The user's current contexts are the user's location, the current time with the user's schedule, and the user's activity.

Who is calling?
Where is the user?
What the user is doing?
When is it?

The User-rule Conflict Resolving (UCR) agent is responsible for responding to a client's SM agent for the user-rule conflict-resolving request. The request contains user rule information that is assigned by the URA agent. The UCR agent selects one rule that is the most specific among the assigned rules. The more conditions a rule has, the more specific a rule is considered to be. The Call Simulation service is provided for testing without connecting to a MiTAI Gateway 35. A window with a form serves this functionality.

Figure 6:
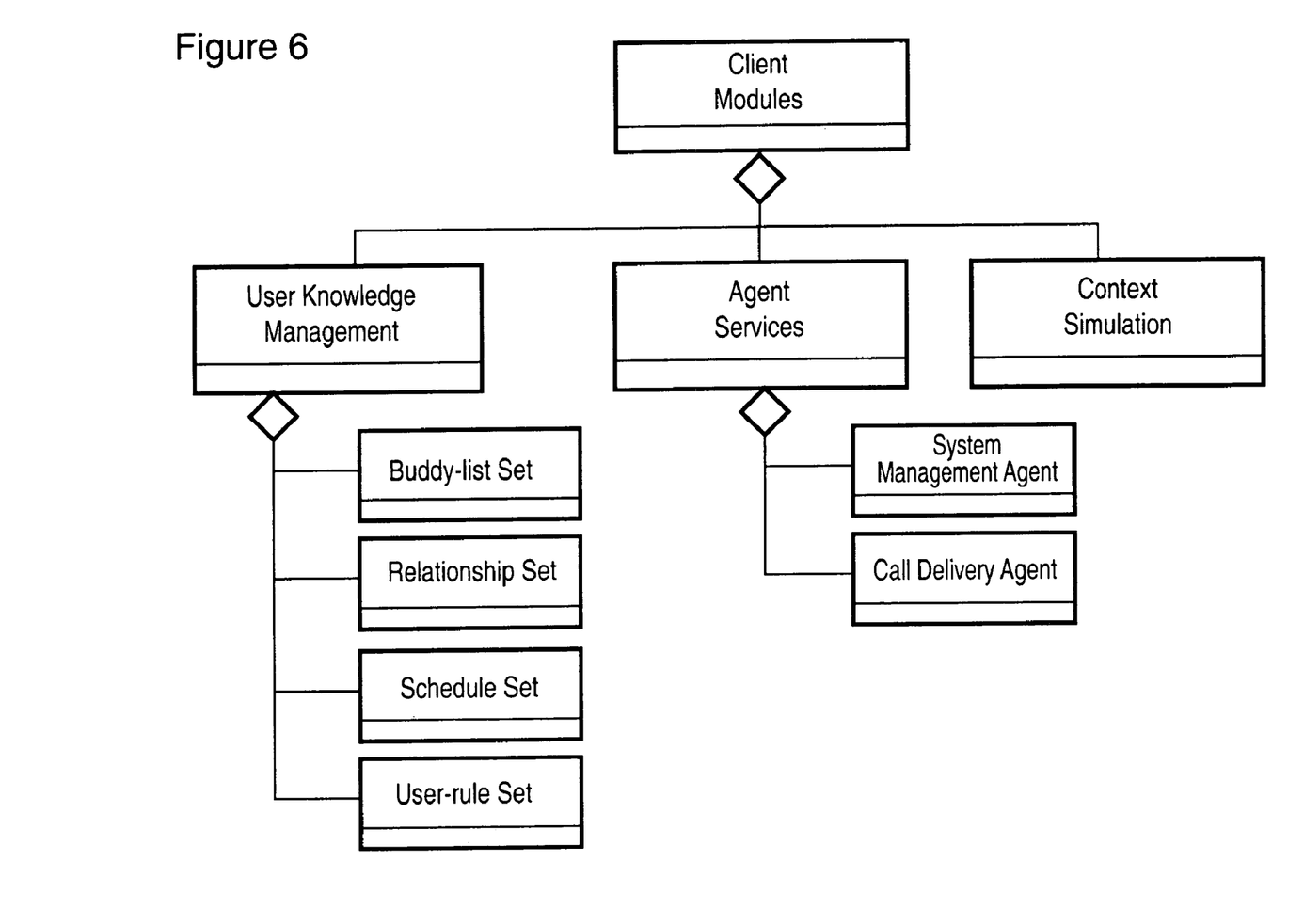
FIG. 6 is a class diagram for the client modules of FIG. 4.

As shown in the client module class diagram of FIG. 6, the client modules are divided into three subsystems: User Knowledge Management, Agent Services, and Context Simulation. A user can manipulate personal knowledge through the User Knowledge Management module.

The Call Delivery (CD) agent is responsible for communication with the phone switch or PBX 5 through MiTAI Gateway 35. In particular, the CD agent registers events to MiTAI Gateway 35 and waits for the notification of an incoming call for a user. When the notification arrives, the CD agent sends a request to the SM agent for further processing and waits for response. This response from the SM agent contains an action to be taken as a result of an entire call processing. Then the CD agent is responsible for requesting the selected action to the MiTAI Gateway 35.

The System Management (SM) agent is responsible for managing other agents' status and sequencing call processing according to the system agents' priority. When the CD agent requests call processing, the SM agent scans the agents' status tuples in the TSpaces 47 and makes a sequence table according to their priority. It sends a processing request to the highest-priority-agent, waits for a response and then sends it to the next-highest-priority-agent. When the SM agent receives a response from the lowest-priority-agent, it sends an information tuple back to the CD agent.

The Context Simulation module serves as a context agent that dynamically detects, interprets and updates the user's current contexts. A Context Simulation window includes all of the possible contexts, which are set by a system administrator, and a user selects from them.

TSpaces 47 (i.e. tuple spaces), are implemented in one or more servers 33 as a network communication buffer with database capabilities. A more complete description of TSpaces 47 may be found in http://www.almaden.ibm.com/cs/TSpaces/, and in co-pending UK Patent Application No. 9920051.1. TSpaces 47 enable communication between applications and devices in a network of heterogeneous computers and operating systems. TSpaces 47 provides group communication services, database services, URL-based file transfer services, and event notification services. The TSpaces 47 are implemented in the Java programming language and thus automatically possess network ubiquity through platform independence, as well as a standard type of representation for all data types. The TSpaces system is appropriate for any application that has distribution or data storage requirements. It can perform many of the duties of a relational database system without imposing an overly restrictive (and primitive) type system, a rigid schema, a clumsy user interface or a severe runtime memory requirement. In the present invention, the TSpaces Server 33 is the medium between the system and user knowledge stores. However, it will be understood that Tspaces 47 may be replaced by a relational database or other shared database providing equivalent functionality for managing knowledge transactions, including read, write, update, take and scan, as well as event handling, such as registration and notification of events.

The MiTAI Gateway 35 facilitates communication to the MITEL telephony servers (i.e. PBX 5) for processes that are not based on the "C" development language. A description of the MiTAI Gateway 35 may be found in Ramiro Liscano, "MiTAI Gateway", *MITEL Networks*, June 2001. The MiTAI Gateway 35 is a Windows based process that can be executed on any Windows platform. It can manage a single socket connection from any other process on a network and it supports a limited session protocol.

The MiTAI Gateway Server 35 is the intermediate system between the PBX 5 and the ACD's Application Level subsystem 45. The Application Level subsystem 45 registers an event to the MiTAI Gateway server 35 for the purpose of monitoring incoming calls.

In terms of system topology, the User Interface 41 is built on a Windows Platform, and it interacts with the Application Level 45 through an Event Handler 43. The Application Level 45 subsystems use TSpaces server 43 as the medium for communication and for accessing the System Knowledge Management of the server and clients.

All of the knowledge, which includes user information, user rules, the user's current context information, and call information, is stored in the TSpaces 47. The unit of storage is a tuple, as set forth in the references cited above, and as discussed in the Appendix to this specification.

User Information consists of basic user information, relationship information, a buddy list, user preference rules and the dynamically varying user's current context information. User Information is stored in a tuple named "UserProfile" and the structure is as follows:

{"UserProfile", id, user-info, relationship, buddy-list, user-rule, context} where "UserProfile" is the name of the tuple, id is user identification for uniquely identifying a user in the system. The user-info field contains basic user information about the user such as: password, name, phone numbers, and the user's time schedule. The phone numbers are extension phone numbers within the PBX 5, such as my office and secretary's phone numbers (e.g. 4001). This field also contains the schedules of the user. Schedules for lunches and meetings may be input by the user directly or ascertained from another application (e.g. Microsoft Outlook, etc.). The relationship field contains relationship information which is defined by the user in a relationship hierarchy using the user interface. The user can add any person as his "buddy" in a buddy list. The buddy list contains information about such persons including as name and phone number, as well as their relationship to the user. The user-rule field contains a user preference rule. The user creates his/her personal preferences for handling incoming calls via the user interface 41. The conditions in a rule can make use of the contexts, the buddy list and a relationship selected from the relationship information hierarchy. In that regard, the context field contains context information. The context determining parameters, which are used in the system, are location, the user's current activity and the present time. The location and activity contexts have a hierarchy, so that they may have sub-contexts. The current context information of a user can be either a real context or a pretended context set by the user. The real context information is updated by the context agent(s) whereas the pretended context, on the other hand, is set and controlled by the user. The pretended context is designed to override the real contexts if so desired by the user. The hierarchy of the location parameters is defined by a system administrator. Thus, if a location's properties are coupled with the phone number, the system can deliver the user's call to the phone nearest to the user's current location.

There are two kinds of activities that can be defined. Some activities can be automatically detected by the system, whereas others can only be assumed or set by a user. For example, the system is able to know whether the user is 'on the phone', but it is difficult to judge if the user is 'busy at work' or 'having a break'. Therefore, detectable activities are updated by the system automatically, and others are set by the user. A receiver's time context is set according to his time schedule. For example, if the user's lunchtime is scheduled from 12 p.m. to 1 p.m., the system can assume that the user is having lunch during that time period.

Call information is contained in a tuple that an agent shares to communicate with other agents for processing an incoming call. Therefore, it contains all of the necessary data fields for caller information and user preference rules. Agents take the "Call" tuple from the TSpaces 47 and update it according to their responsibility. For example, the RA agent assigns relationships between the caller and the receiver, the URA agent assigns all the appropriate user rules, and the UCR agent resolves user rule conflict by selecting only one user rule. The form of this tuple is:

{"Call", dest-agent, source-agent, id, call-info, user-rule} where "Call" is the name of the tuple, dest-agent is the destination agent that is expected to receive this tuple, the source-agent field identifies the source agent that sends this tuple, the id field is user identification, and the call-info field contains basic information of both the caller and the receiver such as phone number, name and relationship information between them. The user-rule matches user rule(s) assigned by the agents. The "Call" field and the dest-agent field are used when agents register an event in the TSpaces server 33. The following is a part of the SM agent event registration routine to the TSpaces server 33:

Tuple template=new Tuple("Call", "SMAgent", new Field (String.class), id, new Field(String.class), new Field (String.class), new Field(String.class));
seqNum=ts.eventRegister(TupleSpace.WRITE, template, this, newThread);

It requests the TSpaces server 33 to notify the SM agent when a tuple is posted where the first field is "Call", the second is "SMAgent", and the fourth is user id, and where the third field is 'new Field(String.class)' which means that any value will be acceptable for this field.

Having described the basic structure and operation of Applicant's contextual call handling system, the following is a description of detailed component interactions according to the present invention. This description is set forth in terms of a SIP based system, since SIP is now and likely will remain the dominant protocol for IP telephony. Although the example used refers to SIP, someone skilled in the art will appreciate that the example can be extended to any call set up protocol.

According to the present invention, standard SIP is used with the addition of a Hypothetical header. As with standard SIP, the header is text based, containing one of two values: YES or NO. A "YES" in the Hypothetical header indicates that the INVITE message is a request for availability. An INVITE message with either no hypothetical Header or with a header value of NO indicates a normal Invite.

In operation, the hypothetical call operates the same way as a normal SIP INVITE. However the INVITE is interpreted as a request for a continuous indication of availability. When a user's availability changes with respect to a user, a SIP NOTIFY message is sent to the subscriber which contains a payload with the new availability information. In keeping with standard SIP, the availability indication remains in force until the subscribing user terminates the session with a BYE message.

As discussed above, the Call Delivery (CD) agent handles incoming requests for calls (including requests for "hypothetical" calls to provide a continuous indication of availability). The CD agent presents the received information to the rest of the contextual call handling system for a decision on disposition, and then executes that decision by signaling the external system (i.e. PBX 5). More particularly, the Call Delivery agent extracts the pertinent information describing the call and posts the information in the tuple space 47 for use by other system agents. Similarly, in the case of hypothetical calls, the CD agent extracts the information from the incoming message and places it in a queue (i.e. a queue of hypothetical requests in either the tuple space or within the CD agent itself) with other hypothetical calls. The contents of each item in the queue are:

a) the identity of the subscriber (from the FROM header on the incoming message)
b) the parameters describing the call that it has extracted from the message
c) the previously determined availability of the user—(i.e. available, unavailable, or not yet determined).

When the subscription (i.e. information) is first placed in the queue, the value of the availability information will be set to 'not yet determined'. When not in the process of handling a normal call request, the CD agent steps though the queue of hypothetical calls and presents them to the rest of the system as it would a normal call.

According to the present invention, the following additional modifications are provided to the contextual call handling system of Applicant's co-pending patent application entitled "Context Aware Call Handling System":
a) rules can be created by the user that incorporate contextual features to describe availability and in response generate indicators of fuzzy availability. Along with the rules that determine call handling suggestions, these rules are executed in the User Rule Assigning Agent (URA)
b) the rules in the UR agent that decide specific handling of calls are extended to give an indication of the availability that the decisions indicate. Thus, rules that direct the call to the user will show 'available', away from the user will show 'unavailable' and rules which ask the user will show 'no decision'
c) the Conflict Resolving (CR) agent is modified to generate crisp indicators of availability from the generated indicators of fuzzy availability in conjunction with specific decisions on call handling. The CR agent accepts the decisions of the specific call handling rules as definitive. In any case in which these rules cannot make a decision, the CR agent composes the fuzzy indicators to produce a crisp indicator.

The availability rules operate in the same manner as the rules described in co-pending patent application "Context Aware Call Handling System". These rules take into consideration the call specific and contextual factors that have been placed into the tuple space 47 to generate fuzzy indicators of availability. The fuzzy values of availability are:

Not Available
Not Very Available
Somewhat Available
Available
Very Available

These fuzzy indicators are ascribed values ranging from 0 (Not Available) through 4 (Very Available)

The rules are of the form:

If I am in my office and the call is from my boss then I am Very Available

If the time is lunch time then I am Available

This additional capability of the present invention allows the user to set up general rules to indicate his/her availability based on the same factors (e.g. time, location, sender etc.) as discussed in co-pending application "Context Aware Call Handling System".

As discussed above, each of the availability rules operates in the UR agent (User Rule Assigning Agent) and each rule supplies its results to the Conflict Resolving agent. The results given by a rule are of the form:

Unique Identifier for Rule

Value of Availability

List of the Factors that were considered by the rule (i.e. the list of items from Table 1).

The availability rules that are triggered by a hypothetical request all place answers in the tuple space 47 where they are retrieved by the subscribing Conflict Resolving (CR) agent.

According to a further aspect of the invention, a mechanism is provided to combine the fuzzy returned values into a crisp indication of availability, to avoid conflicts among the use of certain factors. For example, a user may have created a rule that says that he is very unavailable between 1 p.m. and 3 p.m. but is very available to members of a certain project at anytime. The problem arises as to what indication of availability should be gathered for the factor of time. In one case, the time factor indicates unavailability and in the other case it indicates availability. In the preferred embodiment, the conflict is resolved by using only the most specific rule in which the factor is involved, as determined by a count of the number of factors involved in the rule—the rule with the most factors being considered to be more specific and thus more relevant. When it is not possible to select one rule among conflict rules, the system either selects the most recently created rule or simply chooses a rule at random (or randomly chooses a rule in the event of a tie among most specific rules). The use of the specific rules in call handling for availability decisions solves the problem of compatibility between availability rules and call handling rules discussed above.

In operation, the CR agent is supplied with a number of availability indications, as discussed below. Each of these is given a name and contains the identities of the other factors and rules that were used in the evaluation of the rule. The number of other factors gives an indication of the specificity of the rule.

The specificity of a rule is the number of factors that it returns as being considered in rule evaluation. In operation, the following steps are repeated for all returned availability indicators:

1. For each of the supporting factors in the rule, examine the table for an entry for that factor
2. If a table entry does not exist for the supporting factor create it with the specificity value set to 0
3. If the specificity of the supporting factor table entry is less than or equal to the specificity of the current rule, replace the availability value with the availability value of the current rule and replace the specificity value with the specificity value of the current rule.
4. If the specificity value of the supporting factor table entry is equal to the specificity value of the current rule, then replace the current availability value of the supporting factor table entry with the average of the availability average of the current rule and the current availability of the supporting factor table entry.
5. Repeat this until all returned availability indicators for this rule have been considered
6. Repeat for all rules The operation of the CR agent with respect to the composition of returned indicators from the availability rules is as follows. It starts with an empty table of the form shown in Table 1.

TABLE 1

Factor Table

| Factor | Specificity | Availability |
| --- | --- | --- |
| Location | 3 | 2 |
| Time | 6 | 4 |
| Relationship | 4 | 3 |

To see how the algorithm works, consider the example of the following rule being fired and being composed with the values as shown in Table 1:

If I am in my office and the call is from my boss and the call type is work then I am Very Available There are three factors in this rule: location (office), call relationship (boss) and call type (work). Thus the rule has a specificity of 3.

Taking the first factor of location, the specificity value of the rule (3) is compared with the specificity value (2) currently in the table.

Since the current rule value (3) is greater than the current table value, both the table value for specificity and availability are updated with the current rule values resulting in the values shown in Table 2:

TABLE 2

Factor Table after location

| Factor | Specificity | Availability |
|---|---|---|
| Location | 3 | 4 |
| Time | 5 | 4 |
| Activity | 3 | 4 |
| Call Type | 3 | 3 |

Next, the factor of relationship is considered. Since there is no row for that factor currently in the table, a row is created for it and the value for availability and specificity for the current rule are placed in it. This results in the values shown in Table 3:

TABLE 3

Factor Table after call relationship

| Factor | Specificity | Availability |
|---|---|---|
| Location | 3 | 4 |
| Time | 5 | 4 |
| Activity | 3 | 4 |
| Relationship | 3 | 4 |
| Call Type | 3 | 3 |

For the final factor of call type, the specificity of the current rule (3) is the same as the specificity value of the row in the factor table. Thus, from step 4, above, the availability value from the current rule (4) is averaged with the current value in the factor table and the result is placed in the table to create the result as shown in table 4

TABLE 4

Factor Table after call type

| Factor | Specificity | Availability |
|---|---|---|
| Location | 3 | 4 |
| Time | 5 | 4 |
| Activity | 3 | 4 |
| Relationship | 3 | 4 |
| Call Type | 3 | 3.5 |

This foregoing methodology creates a table of the contextual factors that have been found by the rules to be relevant to the determination of availability. These factors may have been involved in multiple rules but as is noted above the most specific rule is the one that gives the best indication of availability. The factors are thus matched with the availability generated by the most specific rule that used them. The inventive method has the advantage of being more sensitive to the most specific rules since it is those rules that tend to spread their availability indications across the factors. More general or low specificity rules will tend to be supplanted by rules more suited to specific cases. The foregoing is but one method of composing fuzzy indicators of availability from rules. Others methods are possible, but the essential method of composition remains the same.

As a result of the foregoing method, a table is created containing the processed availability indicators derived from all of the relevant factors in the tuple space 47. A composite fuzzy value may be derived from the multiple table values by a variety of techniques, which include:
1. Maximum value
2. Minimum value
3. Arithmetic average
4. Geometric average
5. Specificity weighted average
6. . . .

For the present example it will be assumed that one of the averaging techniques is used to obtain a composite fuzzy value. This can be converted to a crisp fuzzy value by comparison against a standard value. Values above that level will be considered to indicate availability. Values below that level will indicate unavailability. The cutoff value may be biased high or low to facilitate either optimistic or pessimistic opinions on availability.

As an example of this process, and taking the values indicated in Table 4, calculating a specificity weighted availability average yields a value of:

(Sum for all factors (specificity*availability))/(Sum for all factors(specificity) or $$\frac{(3*4) + (5*4) + (3*4) + (3*4) + (3*3.5))/(3+5+3+3+3)} = (12 + 20 + 12 + 12 + 10.5)/17$$
$$= 66.5/17$$
$$= 3.91$$

Assuming that a comparison value of 2.5 had been chosen with all values at or above that being considered to mean available and all values below that being considered to mean unavailable, a comparison is made between the composite fuzzy value of 3.91 and the comparison value of 2.5. The derived crisp value of availability in this example therefore becomes 'available.'

In summary, call handling rules in the system according to the present invention operate in the same way as set forth in our co-pending patent application entitled "Context Aware Call Handling System" with the exception that each of the suggested actions also contains an indication of availability. Thus, calls that are directed to the user will have an availability indicator of 'available', away from the user will have an indicator of 'unavailable', and ask the user has an indicator of 'not yet determined'.

Both the availability rules and the call handling rules provide a crisp indicator of availability. The call handling rules predominate since they result in specific actions. If they specify either 'available' or 'unavailable', the value will be returned to the Call Delivery agent. If the call handling rules indicate availability 'not yet determined', the crisp availability determined from the availability rules will be returned to the CD agent.

The Conflict Resolving agent returns the value of availability it has determined for the hypothetical call to the Call Delivery agent. The CD agent examines the value of availability for the call already stored in its queue. As stated above, any one of three values is possible ('available', 'unavailable' or 'not yet determined' (the hypothetical call message has just been received). If the returned availability is different than the stored availability, the stored availability is updated with the new value and a NOTIFICATION message is sent to the subscribing party informing him/her of the new message.

Modifications and variations to the invention are possible. All such modifications and variations are believed to be within the sphere and scope of the present invention as defined by the claims appended hereto.

The invention claimed is:

1. A method of generating a user availability information to a subscriber from a plurality of availability rules with fuzzy indictors of degrees of a user availability set by a user, comprising:
   receiving a request from said subscriber for said user availability information resulting in one or more firing responses of predetermined ones of said availability rules, said responses are of the form: unique identifier for rule, fuzzy value of availability, and a list of factors that were considered by the rules, and said factors include: time, location, and relationship between said subscriber and said user;
   creating a factor table for each of said responses including a specificity value for each of the factors considered by said rules and the fuzzy value of availability for each rule;
   calculating a composite fuzzy value of user availability from said values in said factor table, said calculating includes one of either;
   selecting a maximum one of said values of availability in said factor table,
   selecting a minimum one of said values of availability in said factor table,
   performing an arithmetic average of said values of availability in said factor table,
   performing a geometric average of said values of availability in said factor table, and
   performing specificity weighted average of said values of availability in said factor table;
   computing a crisp indication of user availability by comparing said composite fuzzy value to a threshold availability value and generating one of either a crisp indictor of availability in the event that said composite fuzzy value of user availability exceeds said threshold availability value, or a crisp indicator of unavailability in the event that said composite fuzzy value of user availability is less than said threshold availability value; and
   transmitting said crisp indication of user availability to said subscriber.

2. A method as claimed in claim 1, wherein said step of creating said factor table further includes:
   (a) for each one of the factors considered by an associated rule searching said factor table for an entry for said one of said factors;
   (b) in the event said factor table does not contain said entry then creating a new entry in the factor table for said one of said factors having a specificity of zero;
   (c) in the event the factor table contains said entry then comparing the specificity of said one of said factors; and
      (i) if the specificity of said entry is less then the specificity of said one of said factors then replacing the value of availability in the entry with the value of availability of said one of said factors ad replacing the value of specificity in the entry with the specificity of said one of said factors;
      (ii) if the specificity of said entry is equal to the specificity of said one of said factors then replacing the value of availability in the entry with the average of the values of availability in the entry and said one of said factors;
   (d) repeat steps (a) to (c) for all of said factors; and
   (e) repeat steps (a) to (d) for all of said responses.

3. A method as claimed in claim 1, wherein said specificity weighted average is given by (sum for all factors (specificity*availability))/(sum for all factors (specificity)).

* * * * *